US012785533B2

(12) United States Patent
Tsai et al.

(10) Patent No.: US 12,785,533 B2
(45) Date of Patent: Nov. 3, 2026

(54) OFFSET OVERLAP TYPE OF MODULATED FERROMAGNETIC POLE PIECE RING AND METHOD THEREOF

(71) Applicant: National Cheng Kung University, Tainan City (TW)

(72) Inventors: Mi-Ching Tsai, Tainan City (TW); Po-Wei Huang, Tainan City (TW); Wen-Hao Yang, Tainan City (TW); Tsung-Wei Chang, Tainan City (TW)

(73) Assignee: National Cheng Kung University, Tainan City (TW)

( * ) Notice: Subject to any disclaimer, the term of this patent is extended or adjusted under 35 U.S.C. 154(b) by 268 days.

(21) Appl. No.: 18/631,126

(22) Filed: Apr. 10, 2024

(65) Prior Publication Data

US 2025/0023439 A1 Jan. 16, 2025

(30) Foreign Application Priority Data

Jul. 13, 2023 (TW) ................................ 112126279

(51) Int. Cl.
*H02K 49/10* (2006.01)

(52) U.S. Cl.
CPC .................................. *H02K 49/102* (2013.01)

(58) Field of Classification Search
CPC ...... H02K 49/102; H02K 49/106; H02K 1/27; H02K 1/2733; H02K 1/2793; H02K 15/021; H02K 15/038; F16H 13/12; F16H 49/005
See application file for complete search history.

(56) References Cited

U.S. PATENT DOCUMENTS

2011/0012458 A1* 1/2011 Atallah .................. H02K 51/00 310/103
2015/0348690 A1* 12/2015 Fullerton .............. H01F 7/0221 335/295
2018/0269770 A1* 9/2018 Powell ................. H02K 49/102

FOREIGN PATENT DOCUMENTS

CN 116490706 A * 7/2023 ............... H02K 7/11
WO WO-2018043288 A1 * 3/2018 ............... H02K 1/27

OTHER PUBLICATIONS

18631126_2026-01-24_CN_116490706_A_H.pdf (Year: 2026).*
18631126_2026-01-24_WO_2018043288_A1_H.pdf (Year: 2026).*

* cited by examiner

*Primary Examiner* — Christopher M Koehler
*Assistant Examiner* — Ahmed F Seck

(57) ABSTRACT

An offset overlap type of a modulated ferromagnetic pole piece ring and a manufacturing method thereof are provided. The modulated ferromagnetic pole piece ring comprises a plurality of ring pieces overlapped with each other. At least one ring piece comprises a plurality of main ribs, a plurality of inner ribs, and a plurality of outer ribs. The main ribs are arranged in a circular manner with intervals in between, and a plurality of first gaps and a plurality of second gaps are formed alternately between the main ribs, wherein the inner ribs are respectively located in the first gaps, and the outer ribs are respectively located in the second gaps.

10 Claims, 7 Drawing Sheets

OFFSET OVERLAP TYPE OF MODULATED FERROMAGNETIC POLE PIECE RING AND METHOD THEREOF

CROSS-REFERENCE TO RELATED APPLICATIONS

This application claims the benefit of priority of Taiwan Application No. 112126279, filed on Jul. 13, 2023, the contents of which are incorporated by reference as if fully set forth herein in their entirety.

FIELD OF INVENTION

The invention relates to a modulated ferromagnetic pole piece ring and a manufacturing method thereof, in particular to an offset overlap type of a modulated ferromagnetic pole piece ring and a manufacturing method thereof.

BACKGROUND OF INVENTION

With the rapid development of magnetic gear type motors and reducers in recent years, the configurations of motors and reducers are constantly being invented and evolved. From the initial magnetic gear reducer, it has evolved to a three-air gap magnetic gear motor integrating the reducer and motor, to a simplified flux modulation motor and a built-in gear motor.

In magnetic gear type motors and reducers, whether it is a built-in gear motor or a magnetic gear reducer, a modulated ferromagnetic core ring is used as the rotor. The rotor plays the role of "flux modulation" in this type of motor and reducer. The "gear ratio" characteristics are achieved through the magnetic flux modulation effect of the rotor, thereby causing the rotor to generate a speed difference.

Furthermore, the modulated ferromagnetic core ring is composed of bodies of magnetic conductive material and bodies of non-magnetic conductive material arranged at equal intervals. In order to achieve ideal performance, the bodies of non-magnetic conductive material are used as connectors between the bodies of magnetic conductive material, such as high-strength and high stability epoxy resin.

However, existing modulated ferromagnetic core rings have problems to varying degrees in terms of electromagnetic field characteristics and structure. For example, adding unilateral ribs to the modulated ferromagnetic core ring can sacrifice electromagnetic field performance in exchange for higher structural strength, but it will only allow the modulated ferromagnetic core ring to withstand unilateral radial force. If the modulated ferromagnetic core ring can withstand the bilateral radial force, it is necessary to set up bilateral ribs in the modulated ferromagnetic core ring for holding. The structure of the bilateral ribs will have serious magnetic flux leakage (eddy current loss) problems, resulting in a significant decrease in electromagnetic field performance.

As a result, it is necessary to provide an offset overlap type of a modulated ferromagnetic pole piece ring and a manufacturing method thereof to solve the problems existing in the conventional technologies, as described above.

SUMMARY OF INVENTION

One object of the present disclosure is to provide an offset overlap type of a modulated ferromagnetic pole piece ring. The inner ribs and the outer ribs are arranged alternately between the main ribs. The structure can not only overcome the serious problem of magnetic flux leakage (eddy current loss), but also enhance the structural strength of the modulated ferromagnetic core ring to have the effect of absorbing vibration and stress.

According to the aforementioned object, an offset overlap type of modulated ferromagnetic pole piece ring is provided. The modulated ferromagnetic pole piece ring comprises a plurality of ring pieces overlapped with each other. At least one ring piece of the modulated ferromagnetic pole piece ring comprises a plurality of main ribs, a plurality of inner ribs, and a plurality of outer ribs. The main ribs are spaced around to form a ring shape, wherein a plurality of first gaps and a plurality of second gaps are arranged alternately between the main ribs. The inner ribs are respectively located in the first gaps, wherein at least one inner rib is connected to the corresponding main rib. The outer ribs are respectively located in the second gaps, wherein at least one outer rib is connected to the corresponding main rib.

According to an embodiment of the present disclosure, two opposite sides of at least one main rib are respectively connected to the corresponding inner rib and the corresponding outer rib.

According to an embodiment of the present disclosure, an inner opening is located on an inner side of at least one inner rib corresponding to the first gap, an outer opening is located on an outer side of the at least one inner rib corresponding to the first gap, and a size of the inner opening is smaller than a size of the outer opening.

According to an embodiment of the present disclosure, an inner opening is located on an inner side of at least one outer rib corresponding to the second gap, an outer opening is located on an outer side of the at least one outer rib in the corresponding second gap, and a size of the outer opening is smaller than a size of the inner opening.

According to an embodiment of the present disclosure, in overlapping an upper ring piece and a lower ring piece, the inner ribs of the upper ring piece overlap over the outer ribs of the lower ring piece, or the outer ribs of the upper ring piece overlap over the inner ribs of the lower ring piece.

According to an embodiment of the present disclosure, an outer rib distance between the outer rib and a geometric center of the ring piece is greater than an inner rib distance between the inner rib and the geometric center of the ring piece.

According to the aforementioned object, a manufacturing method of modulated ferromagnetic pole piece ring is provided. The manufacturing method comprises steps of a preparatory step for preparing a plurality of ring pieces, wherein at least one ring piece comprises: a plurality of main ribs spaced around to form a ring shape, wherein a plurality of first gaps and a plurality of second gaps are arranged alternately between the main ribs; a plurality of inner ribs respectively located in the first gaps, wherein at least one inner rib is connected to the corresponding main rib; and a plurality of outer ribs respectively located in the second gaps, wherein at least one outer rib is connected to the corresponding main rib; a stacking step for rotating sequentially the ring pieces at an angle to stack the ring pieces and bonding the ring pieces to from a core ring body; and a perfusion step for filling a colloid into the core ring body by using a filling mold, wherein the core ring body is covered by the colloid to form a modulated ferromagnetic pole piece ring.

According to an embodiment of the present disclosure, in the stacking step, the inner ribs of an upper ring piece overlap over the outer ribs of a lower ring piece, or the outer ribs of the upper ring piece overlap over the inner ribs of the lower ring piece.

According to an embodiment of the present disclosure, in the stacking step, each of the ring pieces comprises a plurality of iron cores, and the angle at which the ring pieces are rotated is an angle equally divided by a number of iron cores according to a circle of the ring piece.

According to an embodiment of the present disclosure, before the perfusion step, the manufacturing method further comprises an insert step for inserting a plurality of support members into the first gaps and the second gaps.

As described above, in the offset overlap type of modulated ferromagnetic pole piece ring of the present disclosure, the inner ribs and the outer ribs are arranged alternately between the main ribs. The structure can not only overcome the serious problem of magnetic flux leakage (eddy current loss), but also enhance the structural strength of the modulated ferromagnetic core ring to have the effect of absorbing vibration and stress, thereby solving the problems of insufficient strength of the conventional structure and a significant decrease in electromagnetic field performance. The offset overlap type of modulated ferromagnetic pole piece ring of the present disclosure needs to sacrifice some electromagnetic field performance like the magnetic core ring with unilateral ribs, but it can achieve the same structural strength as the magnetic core ring with bilateral ribs. Moreover, compared with conventional motors, applying the offset overlap type of modulated ferromagnetic pole piece ring of the present disclosure to a built-in gear motor can achieve the effects of low speed, high torque, and overload protection.

DETAILED DESCRIPTION OF PREFERRED EMBODIMENTS

In order to make the above and other objects, features, and advantages of the present disclosure more comprehensible, preferred embodiments of the present disclosure will be described below in detail together with the attached drawings. Furthermore, the directional terms used in the present disclosure, for example, up, down, top, bottom, front, back, left, right, inside, outside, side, around, central, horizontal, transverse, vertical, longitudinal, axial, radial direction, the uppermost layer, or the lowermost layer, etc. are only the directions shown in the attached drawings. Therefore, the directional terms are only used to illustrate and express the present disclosure, but not to limit the present disclosure.

Figure 1:
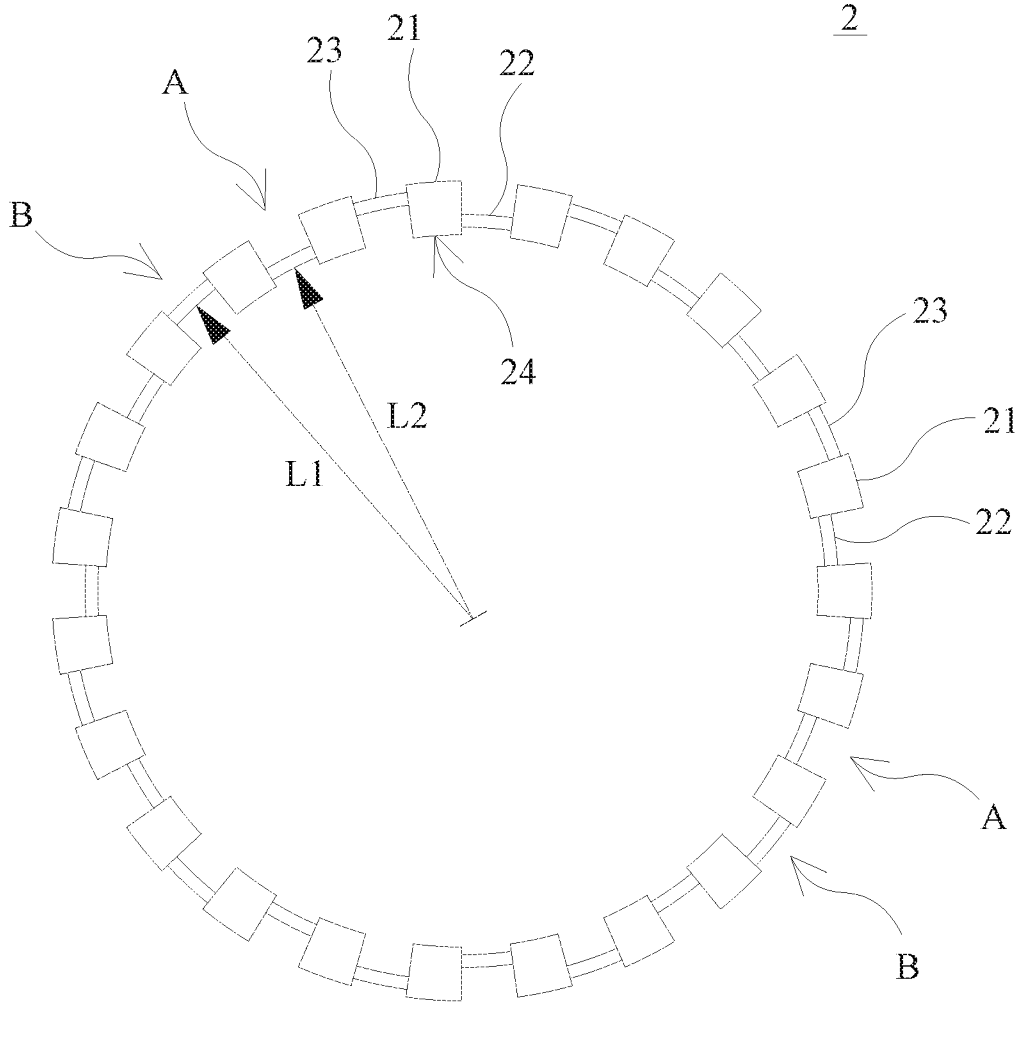
FIG. 1 is a schematic view of a ring piece of an offset overlap type of modulated ferromagnetic pole piece ring according to an embodiment of the present disclosure.
Figure 3:
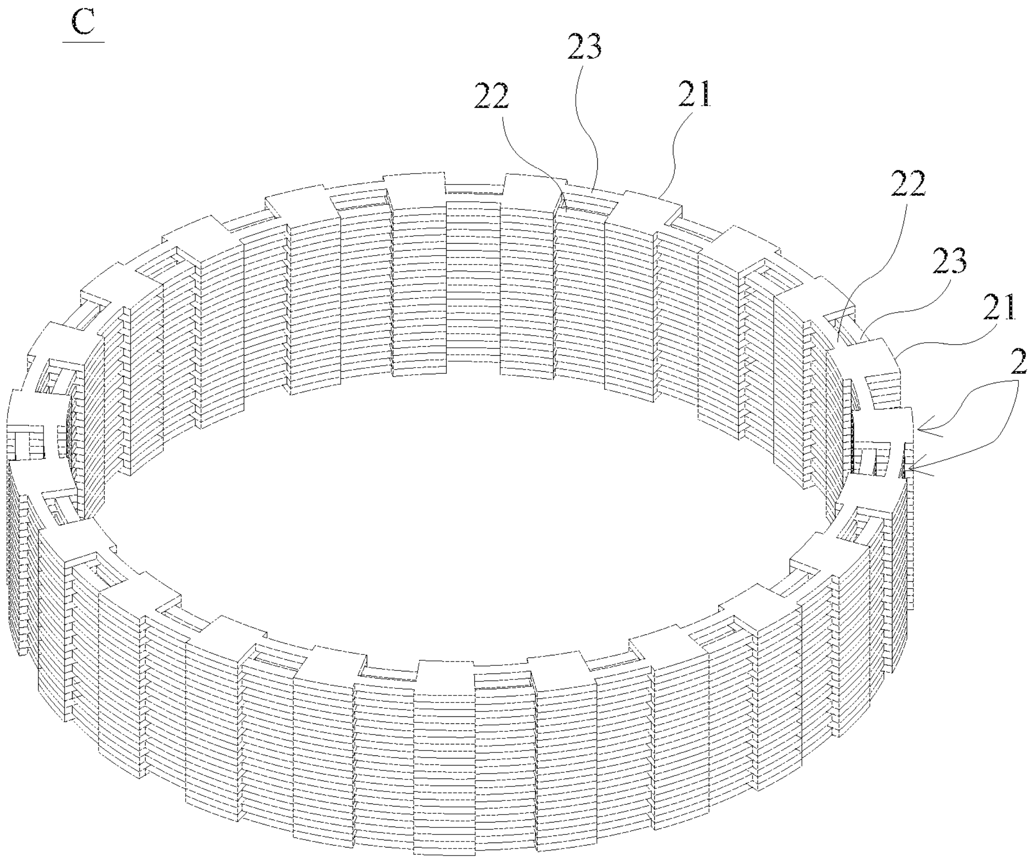
FIG. 3 is a schematic view of an offset overlap type of modulated ferromagnetic pole piece ring before filling colloid according to an embodiment of the present disclosure.

Please refer to FIG. 1 and FIG. 3, an offset overlap type of modulated ferromagnetic pole piece ring according to a preferred embodiment of present disclosure is illustrated. The modulated ferromagnetic pole piece ring is used in a built-in gear motor (pseudo direct drive motor) and configured as a middle ring rotor (not shown), wherein the middle ring rotor is composed of a middle ring output cover, a bearing holding ring, and the modulated ferromagnetic pole piece ring. As shown, the modulated ferromagnetic pole piece ring comprises a plurality of ring pieces 2 overlapped with each other. The detailed structure of each component, assembly relationships, and principles of operation in present disclosure will be described in detail hereinafter.

First, the structure of the built-in gear motor is simply disassembled into two parts. The first part is a permanent magnet synchronous motor, wherein the armature winding of an outer ring generates a rotating magnetic field after excitation and drives a permanent magnet rotor of an inner ring. The second part is a concentric magnetic gear. After the magnetic fields of the permanent magnet rotor of the inner ring and the permanent magnet stator of the outer ring are modulated by the magnetic flux of the rotor of the middle ring, they are coupled to each other in the inner and outer air gaps, and finally the power is output by the middle ring rotor.

Please refer to FIG. 1, at least one ring piece 2 of the modulated ferromagnetic pole piece ring comprises a plurality of main ribs 21, a plurality of inner ribs 22, and a plurality of outer ribs 23. In the embodiment, the main ribs 21 are spaced around to form a ring shape, and a plurality of first gaps A and a plurality of second gaps B are arranged alternately between the main ribs 21. For example, the inner ribs 22 are respectively located in the first gaps A, wherein at least one inner rib 22 is connected to the corresponding main rib 21. The outer ribs 23 are respectively located in the second gaps B, wherein at least one outer rib 23 is connected to the corresponding main rib 21.

Figure 2:
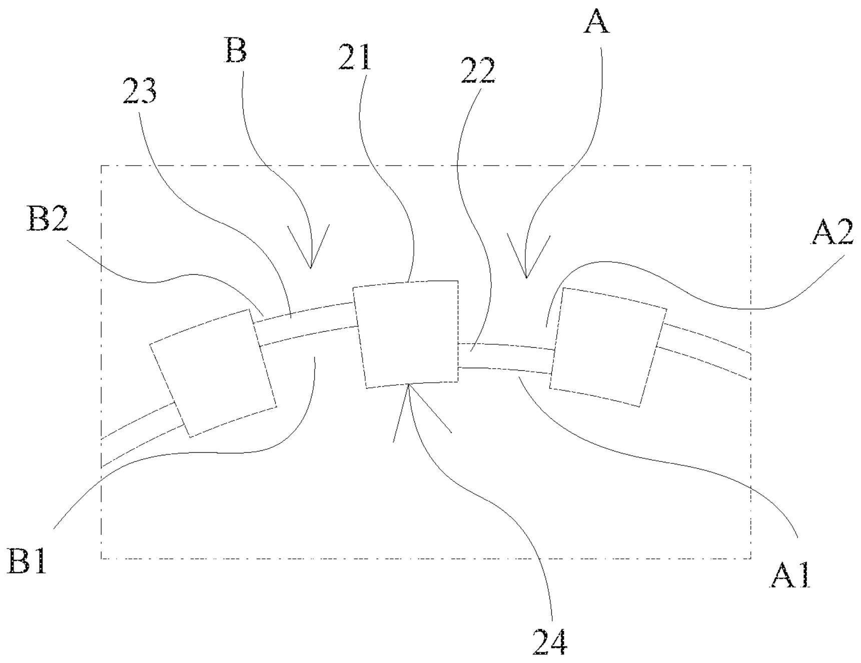
FIG. 2 is a partial schematic view of the ring piece shown in FIG. 1.

Please refer to FIG. 1 and FIG. 2, two opposite sides of at least one or more main ribs 21 are connected to corresponding inner ribs 22 and corresponding outer ribs 23 respectively. In the embodiment, an inner opening A1 is located on an inner side of at least one or more inner ribs 22 corresponding to the first gap A. An outer opening A2 is located on an outer side of the at least one or more inner ribs 22 corresponding to the first gap A, and a size of the inner opening A1 is smaller than a size of the outer opening A2. For example, a horizontal cross-sectional area of the outer opening A2 is at least 2 times, 3 times or more than a horizontal cross-sectional area of the inner opening A1.

Furthermore, an inner opening B2 is located on an inner side of at least one or more outer ribs 23 corresponding to the second gap B. An outer opening B2 is located on an outer side of the at least one or more outer ribs 23 in the corresponding second gap B, and a size of the outer opening B2 is smaller than a size of the inner opening B1. For example, a horizontal cross-sectional area of the inner opening B1 is at least 2 times, 3 times or more than a horizontal cross-sectional area of the outer opening B2.

Please refer to FIG. 1 and FIG. 3, in overlapping an upper ring piece 2 and a lower ring piece 2, the inner ribs 22 of the upper ring piece 2 overlap over the outer ribs 23 of the lower ring piece 2, or the outer ribs 23 of the upper ring piece 2 overlap over the inner ribs 22 of the lower ring piece 2. In the embodiment, an outer rib distance L1 between the outer rib 23 and a geometric center of the ring piece 2 is greater than an inner rib distance L2 between the inner rib 22 and the geometric center of the ring piece 2.

According to the described structure, the modulated ferromagnetic pole piece ring of the present disclosure arranges alternately the inner ribs 22 and the outer ribs 23 between the main ribs 21, so that the inner ribs 22 and the outer ribs 23 are evenly distributed on an inner ring and an outer ring of the ring piece 2, and the ring piece 2 needs to be offset and rotated by an angle. When the number of main ribs 21 of the modulated ferromagnetic pole piece ring is an odd number, a distribution overlap will occur. At this time, the relationship between the number of stacked layers of the ring pieces 2 and the number of main ribs 21 is a multiple. For example, if the number of main ribs 21 of the modulated ferromagnetic pole piece ring is 23, the number of stacked layers can be 23 layers, 46 layers, or more, and then reach the effect of average magnetic circuit. If the number of main ribs 21 of the modulated ferromagnetic pole piece ring is an even number, the number of stacked layers only needs to be a multiple of 2.

Specifically, the built-in gear motor uses the magnetic flux modulation effect to operate the motor and generate a reduction ratio. The magnetic core ring in the built-in gear motor plays an important role in the magnetic flux modulation effect. In the offset overlap type of modulated ferromagnetic pole piece ring of the present disclosure, the inner ribs 22 and the outer ribs 23 are arranged alternately between the main ribs 21. Compared with the conventional modulated ferromagnetic core ring, which only has inner ribs or outer ribs to form a holding of unilateral ribs, the inner ribs 22 and the outer ribs 23 of the offset overlap type of modulated ferromagnetic pole piece ring of the present disclosure can withstand the magnetic attraction force on both sides and have better structural strength. Furthermore, compared with the serious magnetic flux leakage of the bilateral ribs in the conventional modulated ferromagnetic core ring, the offset overlap type of modulated ferromagnetic pole piece ring of the present disclosure can reduce the magnetic flux leakage and has better electromagnetic field characteristics.

As described above, in the offset overlap type of modulated ferromagnetic pole piece ring of the present disclosure, the inner ribs 22 and the outer ribs 23 are arranged alternately between the main ribs 21. The structure can not only overcome the serious problem of magnetic flux leakage (eddy current loss), but also enhance the structural strength of the modulated ferromagnetic core ring to have the effect of absorbing vibration and stress, thereby solving the problems of insufficient strength of the conventional structure and a significant decrease in electromagnetic field performance. The offset overlap type of modulated ferromagnetic pole piece ring of the present disclosure needs to sacrifice some electromagnetic field performance like the magnetic core ring with unilateral ribs, but it can achieve the same structural strength as the magnetic core ring with bilateral ribs. Moreover, compared with conventional motors, applying the offset overlap type of modulated ferromagnetic pole piece ring of the present disclosure to a built-in gear motor can achieve the effects of low speed, high torque, and overload protection.

Figure 6:
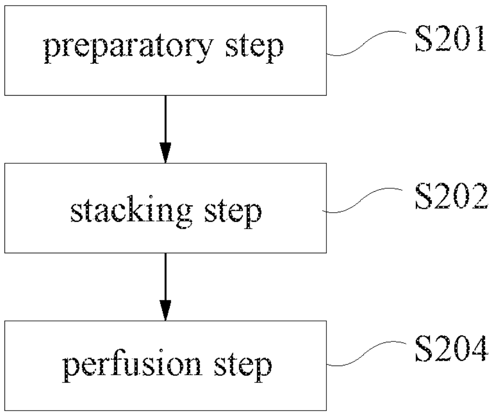
FIG. 6 is a flowchart of a manufacturing method of modulated ferromagnetic pole piece ring according to an embodiment of the present disclosure.

Please refer to FIG. 1 and FIG. 6, a manufacturing method of modulated ferromagnetic pole piece ring according to an embodiment of present disclosure is provided. The manufacturing method comprises a preparatory step S201, a stacking step S202, and a perfusion step S204. The detailed principles of operation in present disclosure will be described in detail hereinafter.

Please refer to FIG. 1 and FIG. 6, in the preparatory step S201, a plurality of ring pieces 2 are provided. At least one ring piece 2 comprises a plurality of main ribs 21, a plurality of inner ribs 22, and a plurality of outer ribs 23. The main ribs 21 are spaced around to form a ring shape, and a plurality of first gaps A and a plurality of second gaps B are arranged alternately between the main ribs 21. The inner ribs 22 are respectively located in the first gaps A, wherein at least one inner rib 22 is connected to the corresponding main rib 21. The outer ribs 23 are respectively located in the second gaps B, wherein at least one outer rib 23 is connected to the corresponding main rib 21.

Please refer to FIG. 1 and FIG. 2, two opposite sides of at least one or more main ribs 21 are connected to corresponding inner ribs 22 and corresponding outer ribs 23 respectively. In the embodiment, an inner opening A1 is located on an inner side of at least one or more inner ribs 22 corresponding to the first gap A. An outer opening A2 is located on an outer side of the at least one or more inner ribs 22 corresponding to the first gap A, and a size of the inner opening A1 is smaller than a size of the outer opening A2. For example, a horizontal cross-sectional area of the outer opening A2 is at least 2 times, 3 times or more than a horizontal cross-sectional area of the inner opening A1.

Please refer to FIG. 1, FIG. 3, and FIG. 6, in the stacking step S202, the ring pieces 2 are rotated sequentially at an angle to stack the ring pieces 2 and the ring pieces 2 are bonded to from a core ring body C. Specifically, in the core ring body C, the inner ribs 22 of an upper ring piece 2 overlap over the outer ribs 23 of an lower ring piece 2, or the outer ribs 23 of the upper ring piece 2 overlap over the inner ribs 22 of the lower ring piece 2. In the embodiment, each of the ring pieces 2 comprises a plurality of iron cores 24. Depending on the number of iron cores, the angle of rotation of the ring pieces 2 will be adjusted accordingly. The angle at which the ring pieces 2 are rotated is an angle equally divided by a number of iron cores according to a circle of the ring piece 2. For example, the number of iron cores in each of the ring pieces 2 is 23, and the angle used to rotate the ring pieces 2 is 360/23=15.65 degrees.

Figure 4:
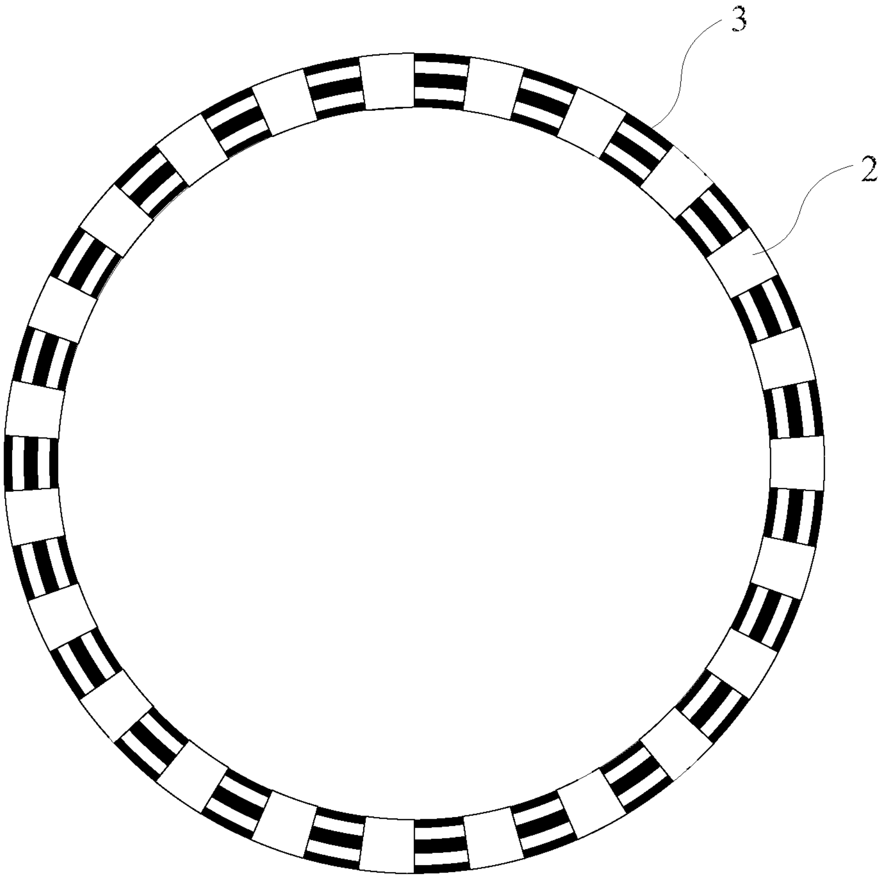
FIG. 4 is a top view of an offset overlap type of modulated ferromagnetic pole piece ring after filling colloid according to an embodiment of the present disclosure.

Please refer to FIG. 1, FIG. 3, and FIG. 6, in the perfusion step S204, a colloid 3 (non-magnetic conductive material) is filled into the core ring body C (magnetic conductive material) by using a filling mold, wherein the core ring body is covered by the colloid to form a modulated ferromagnetic pole piece ring, so that the core ring body C is covered by the colloid 3 to form a modulated ferromagnetic pole piece ring (see FIG. 4). In the embodiment, the colloid 3 is a resin material, such as epoxy resin.

Figure 5:
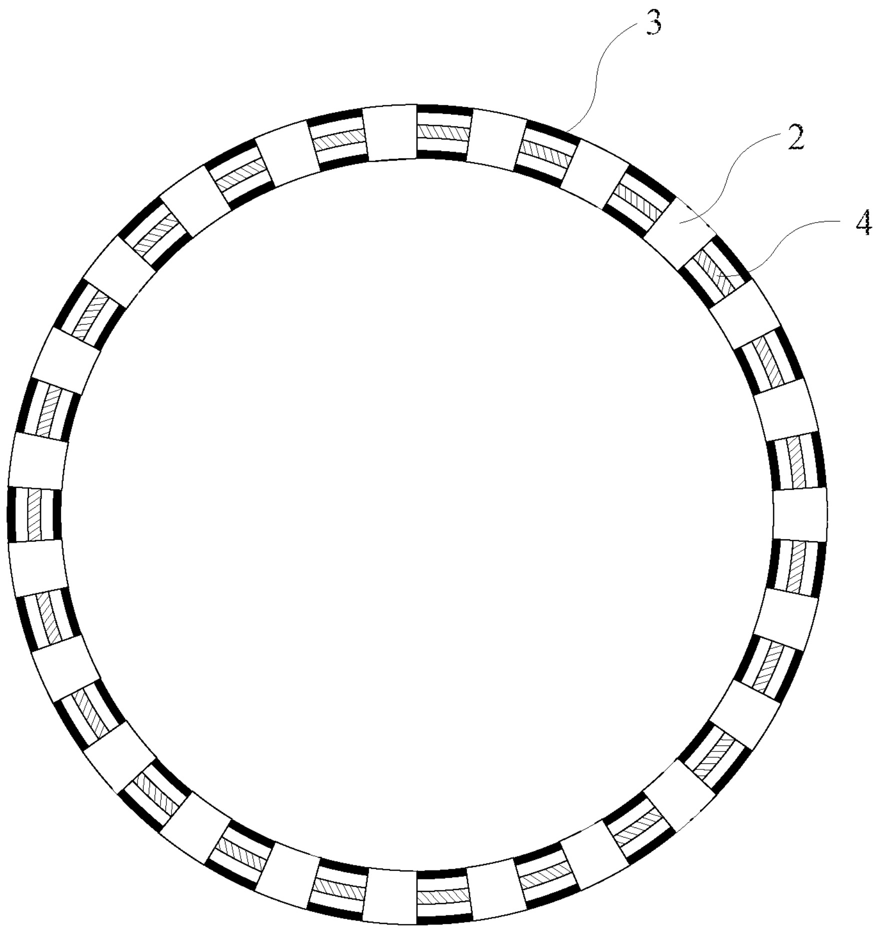
FIG. 5 is a top view of an offset overlap type of modulated ferromagnetic pole piece ring provided with support members according to another embodiment of the present disclosure.
Figure 7:
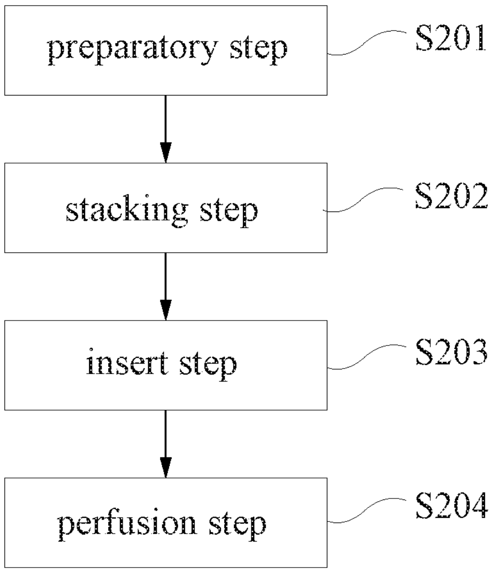
FIG. 7 is a flowchart of a manufacturing method of modulated ferromagnetic pole piece ring according to another embodiment of the present disclosure.

Please refer to FIG. 1, FIG. 3, and FIG. 7, in another embodiment, before the perfusion step S204, the manufacturing method further comprises an insert step S203. In the insert step S203, a plurality of support members 4 are inserted into the first gaps A and the second gaps B, wherein at least one support member 4 is located between the corresponding inner rib 22 and the corresponding outer rib 23 (see FIG. 5).

Specifically, the manufacturing method of the offset overlap type of modulated ferromagnetic pole piece ring of the present disclosure can be directly perform the perfusion step S204 after the stacking step S202 to form the offset overlap type of modulated ferromagnetic pole piece ring (see FIG. 4). Alternatively, the insert step S203 and the perfusion step S204 can be performed after the stacking step S202 to form the offset overlap type of modulated ferromagnetic pole piece ring (see FIG. 5). The implementation is not limited by the disclosure of the embodiment.

As described above, in the manufacturing method of the offset overlap type of modulated ferromagnetic pole piece ring of the present disclosure, the inner ribs 22 and the outer ribs 23 are arranged alternately between the main ribs 21. The structure can not only overcome the serious problem of magnetic flux leakage (eddy current loss), but also enhance the structural strength of the modulated ferromagnetic core ring to have the effect of absorbing vibration and stress, thereby solving the problems of insufficient strength of the conventional structure and a significant decrease in electromagnetic field performance. The offset overlap type of modulated ferromagnetic pole piece ring of the present disclosure needs to sacrifice some electromagnetic field performance like the magnetic core ring with unilateral ribs, but it can achieve the same structural strength as the magnetic core ring with bilateral ribs. Moreover, compared with conventional motors, applying the offset overlap type of modulated ferromagnetic pole piece ring of the present disclosure to a built-in gear motor can achieve the effects of low speed, high torque, and overload protection.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

The invention claimed is:

1. An offset overlap type of modulated ferromagnetic pole piece ring, comprising:
- a plurality of ring pieces overlapped with each other, wherein at least one ring piece comprises:
  - a plurality of main ribs spaced around to form a ring shape, wherein a plurality of first gaps and a plurality of second gaps are arranged alternately between the main ribs;
  - a plurality of inner ribs respectively located in the first gaps, wherein at least one inner rib is connected to the corresponding main rib; and
  - a plurality of outer ribs respectively located in the second gaps, wherein at least one outer rib is connected to the corresponding main rib.

2. The modulated ferromagnetic pole piece ring according to claim 1, wherein two opposite sides of at least one main rib are respectively connected to the corresponding inner rib and the corresponding outer rib.

3. The modulated ferromagnetic pole piece ring according to claim 1, wherein an inner opening is located on an inner side of at least one inner rib corresponding to the first gap, an outer opening is located on an outer side of the at least one inner rib corresponding to the first gap, and a size of the inner opening is smaller than a size of the outer opening.

4. The modulated ferromagnetic pole piece ring according to claim 1, wherein an inner opening is located on an inner side of at least one outer rib corresponding to the second gap, an outer opening is located on an outer side of the at least one outer rib in the corresponding second gap, and a size of the outer opening is smaller than a size of the inner opening.

5. The modulated ferromagnetic pole piece ring according to claim 1, wherein in overlapping an upper ring piece and a lower ring piece, the inner ribs of the upper ring piece overlap over the outer ribs of the lower ring piece, or the outer ribs of the upper ring piece overlap over the inner ribs of the lower ring piece.

6. The modulated ferromagnetic pole piece ring according to claim 1, wherein an outer rib distance between the outer rib and a geometric center of the ring piece is greater than an inner rib distance between the inner rib and the geometric center of the ring piece.

7. A manufacturing method of modulated ferromagnetic pole piece ring, comprising:
- a preparatory step for preparing a plurality of ring pieces, wherein at least one ring piece comprises:
  - a plurality of main ribs spaced around to form a ring shape, wherein a plurality of first gaps and a plurality of second gaps are arranged alternately between the main ribs;
  - a plurality of inner ribs respectively located in the first gaps, wherein at least one inner rib is connected to the corresponding main rib; and
  - a plurality of outer ribs respectively located in the second gaps, wherein at least one outer rib is connected to the corresponding main rib;
- a stacking step for rotating sequentially the ring pieces at an angle to stack the ring pieces and bonding the ring pieces to from a core ring body; and
- a perfusion step for filling a colloid into the core ring body by using a filling mold, wherein the core ring body is covered by the colloid to form a modulated ferromagnetic pole piece ring.

8. The manufacturing method according to claim 7, wherein in the stacking step, the inner ribs of an upper ring piece overlap over the outer ribs of a lower ring piece, or the outer ribs of the upper ring piece overlap over the inner ribs of the lower ring piece.

9. The manufacturing method according to claim 7, wherein in the stacking step, each of the ring pieces comprises a plurality of iron cores, and the angle at which the ring pieces are rotated is an angle equally divided by a number of iron cores according to a circle of the ring piece.

10. The manufacturing method according to claim 7, wherein before the perfusion step, the manufacturing method further comprises an insert step for inserting a plurality of support members into the first gaps and the second gaps.

* * * * *